United States Patent [19]

Barbee

[11] Patent Number: 4,847,970
[45] Date of Patent: Jul. 18, 1989

[54] RADIATOR REPAIR FIXTURE

[75] Inventor: Tom D. Barbee, Louisville, Ky.

[73] Assignee: The Barbee Company, Inc., Louisville, Ky.

[21] Appl. No.: 136,347

[22] Filed: Dec. 22, 1987

[51] Int. Cl.$^4$ .................... B23P 19/04; B23P 15/26; B25B 3/00; B65H 31/38

[52] U.S. Cl. ................ 29/243.5; 29/157.3 R; 29/157.3 B; 29/727; 269/210; 269/2

[58] Field of Search .............. 29/243.5, 726, 727, 29/157.3 R, 157.3 A, 157.3 B, 157.3 C, 157.4; 269/210, 244, 1, 2, 71; 228/183, 184; 248/213.3, 213.4, 316.1

[56] References Cited

U.S. PATENT DOCUMENTS

| | | | |
|---|---|---|---|
| 4,411,414 | 10/1983 | Desiro | 29/727 |
| 4,462,146 | 7/1984 | Desiro | 29/243.5 |
| 4,769,888 | 9/1988 | Desiro | 29/726 |

FOREIGN PATENT DOCUMENTS 2035168  6/1980  United Kingdom .................. 29/727

Primary Examiner—Bruce Y. Arnold
Assistant Examiner—Ronald M. Kachmarik
Attorney, Agent, or Firm—Larson & Taylor

[57] ABSTRACT

A fixture is provided for retaining radiators for repair and/or replacement of radiator tanks and/or cores. A frame is provided with a pair of jaws, one of the jaws being movable manually and by means of a driving element to secure a radiator between the jaws. Guideways are provided in the frame for a crimping tool which is slidable along the guideways to effect crimping of the tabs to secure the radiator header to the tank. A pivotable assembly is disposed above the jaws with air cylinders and pistons for retaining the radiator tank in engagement with the core.

11 Claims, 5 Drawing Sheets

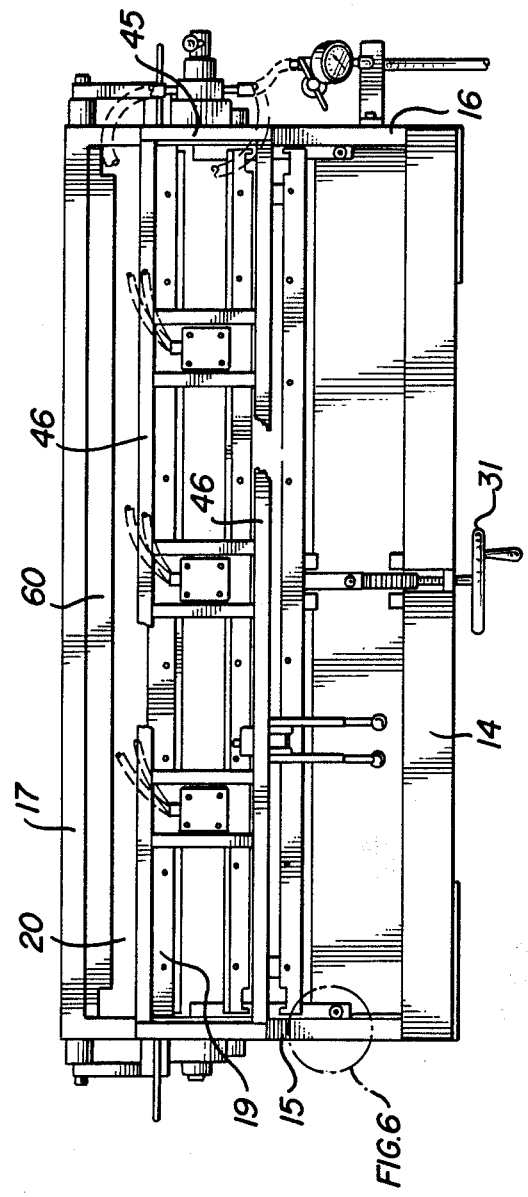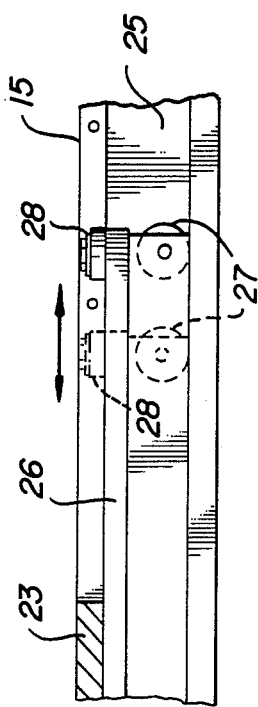

RADIATOR REPAIR FIXTURE

BACKGROUND OF THE INVENTION

The invention relates to a fixture for use in repairing radiators, facilitating removal and replacement of radiator tanks.

Traditionally, radiators have been formed in essentially three parts, the core structure consisting of multile tubes for cooling the liquid within the radiator and a tank on each end of the core. Each end of the core is provided with a header polate for engagement with the tank. In prior years the tank was soldered to the header. More recently plastic tanks have been used with a core of brass, copper or aluminum. The core has a conventional header on each end thereof for engagement with the tank. However, the more recent radiator construction provides tabs on the header which are bent down to secure the tank to the header.

With the advent of the plastic tank radiators, it became difficult to repair and replace the tanks or core structure because of difficulties in releasing the tabs holding the tank to the radiator and in recrimping the tabs. Frequently, by reason of the lack of proper tools, the tank and radiator would become damaged during assembly and disassembly operations, and it became necessary to provide tools and equipment which would permit the assembly and disassembly of the plastic tank with respect to the radiator without damage to the plastic tank or to the header structure of the radiator. It is also desirable to provide even pressure on the tank top during assembly and disassembly operations.

There have been in the prior art attempts to solve the problems noted hereinbefore. U.S. Pat. Nos. 4,411,414 and 4,462,146 disclose a fixture and crimping tool for facilitating the assembly and disassembly of automobile radiators. In the structure disclosed in these patents, clamping gates are provided which are adjustable to receive a radiator header with clamping means to hold the top of the radiator tank in engagement with the core while the radiator is being resoldered or during crimping and decrimping of the header tabs of plastic tank radiators. The present invention seeks to achieve the same objectives as the devices shown in the prior patents referred to but more efficiently and effectively.

BRIEF SUMMARY OF THE INVENTION

According to the present invention, there is provided a frame having a pair of jaws thereon. One of the jaws is fixedly mounted while the second jaw is slidable in the frame. The second jaw may be manually moved rapidly within the frame so that a radiator which is placed between the jaws may be rapidly located in a supported position between the jaws or removed from the jaws. Means is also provided for tightening the jaws to secure the radiator in a locked position between the jaws while the repair or replacement procedures are being carried out.

Each jaw is provided with a guideway which is adapted to receive a crimping tool therein. The crimping tool can thus be moved along each side of the radiator and locked in position to crimp the tabs on the radiator header into engagement with the tank top.

Extending over the top of the supporting frame is a pivotable assembly provided with air cylinders and pistons for engagement with the tank top to retain the tank top in engagement with the radiator header during assembly and disassembly procedures. Upon release of the clamping members from engagement with the tank top, the assembly can be pivoted to a position wherein it does not extend over the tank top so that the radiator can be moved upwardly and outwardly from the frame without interference from the clamping members.

The crimping tool is mounted so that it can be readily moved along the guideways and slidably mounted so that it can move to or away from the radiator clamped between the jaws. Locking means retains the tool in the desired position and an operating arm then actuates the tool to crimp the tab over the radiator tank flange.

An object of the present invention is to provide a fixture for radiators in which the radiator which may be retained between a pair of jaws in which one jaw is fixed and the other jaw may move both manually and by a drive means.

Another object of the present invention is to provide means for expeditiously crimping the tabs on a radiator core into engagement with the radiator tank top while the radiator is retained in a fixed position within a frame.

Other objects and many of the attendant advantages of the present invention will become more readily apparaent upon consideration of the following detailed specification when considered in connection with the accompanying drawings wherein:

BRIEF DESCRIPTION OF THE DRAWINGS

FIG. 5 is a top plan view of the fixture shown in FIG. 1;

FIG. 6 is a partial plan view of the elements shown encircled in FIG. 5;

DETAILED DESCRIPTION OF THE PREFERRED EMBODIMENT

Figure 1:
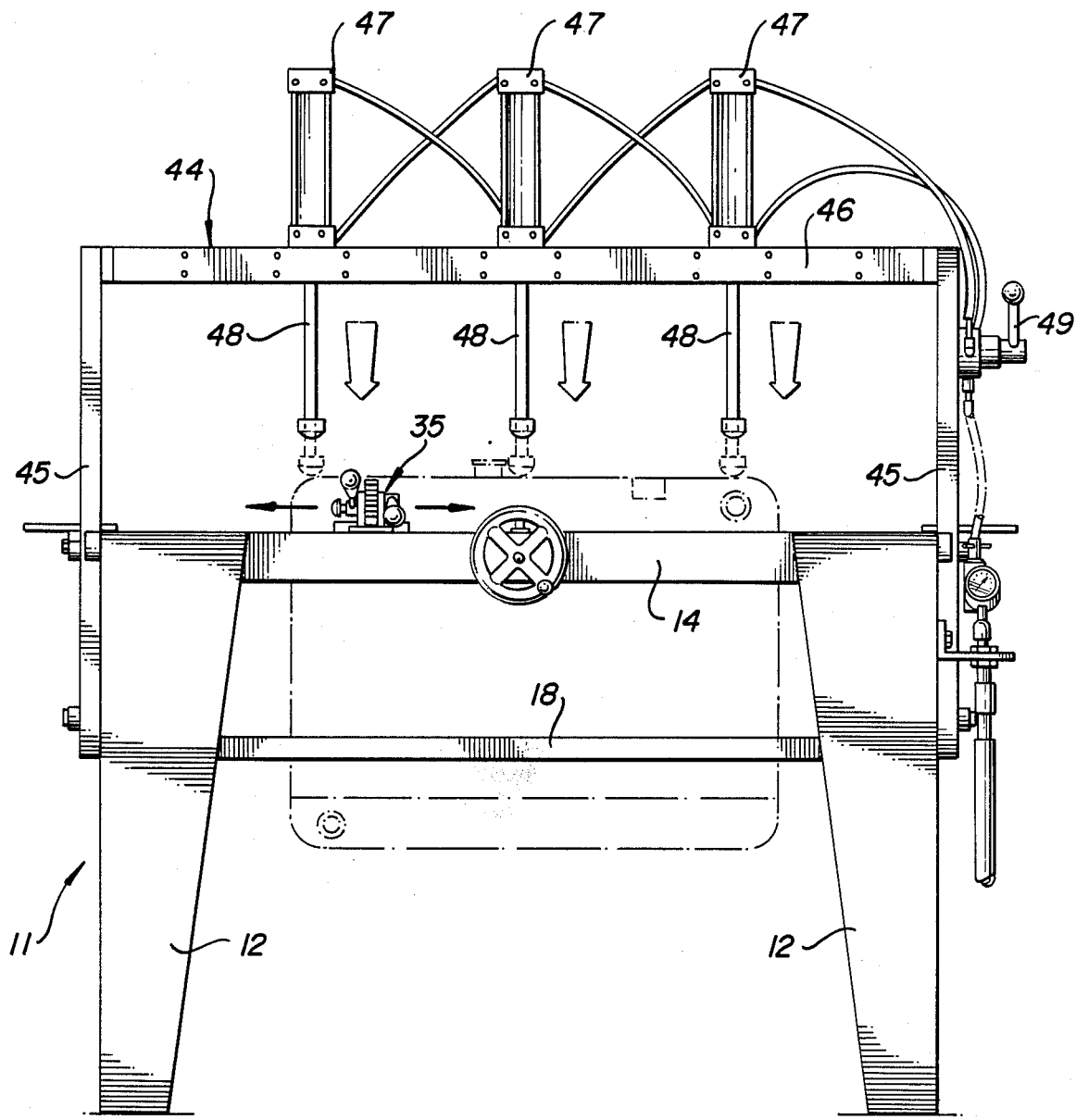
FIG. 1 is a front elevation of a fixture according to the present invention showing in phanton lines a radiator within the fixture.
Figure 9:
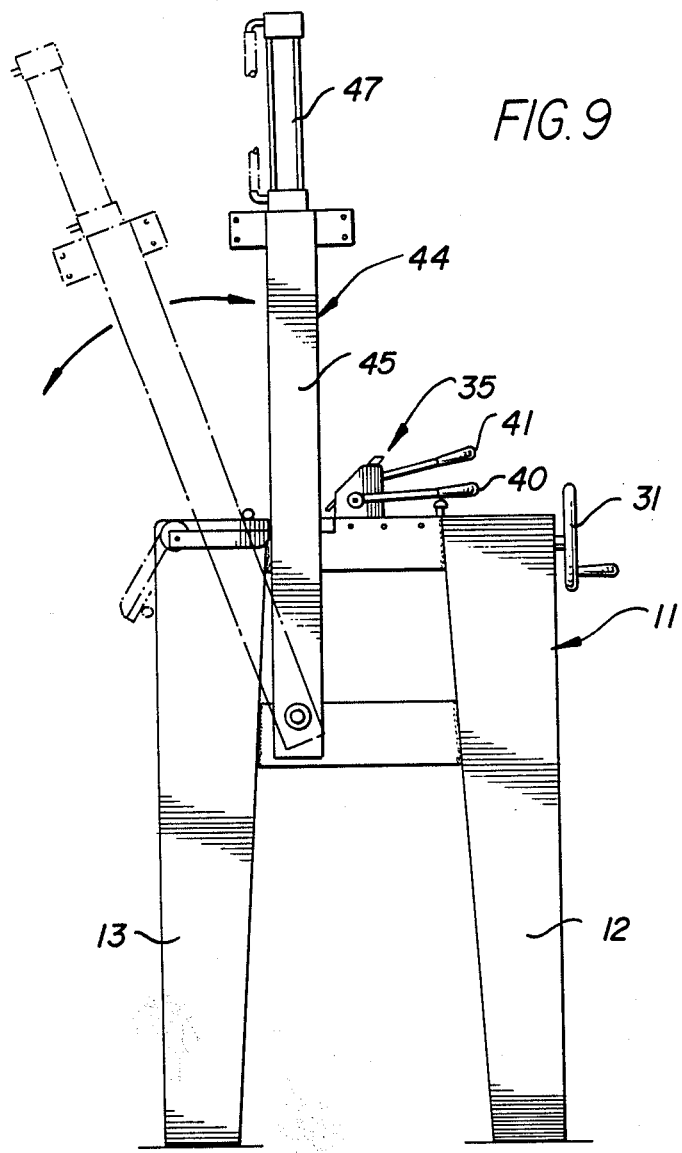
FIG. 9 is a side elevational view of the fixture.

Referring now more specifically to the drawings, in FIG. 1 there is shown a fixture frame 11. This fixture frame includes four supporting legs including a pair of front legs 12 shown in FIG. 1 and an equivalent pair of rear legs 13 (FIG. 9). The fixture includes a rectangular frame secured to the tops of the legs 12 and 13 including a longitudinally extending front frame member 14, cross bars 15 and 16 and a rear frame member 17 as seen in FIG. 5. The frame may also be provided with a shelf 18 which may be used for retaining tools.

Figure 7:
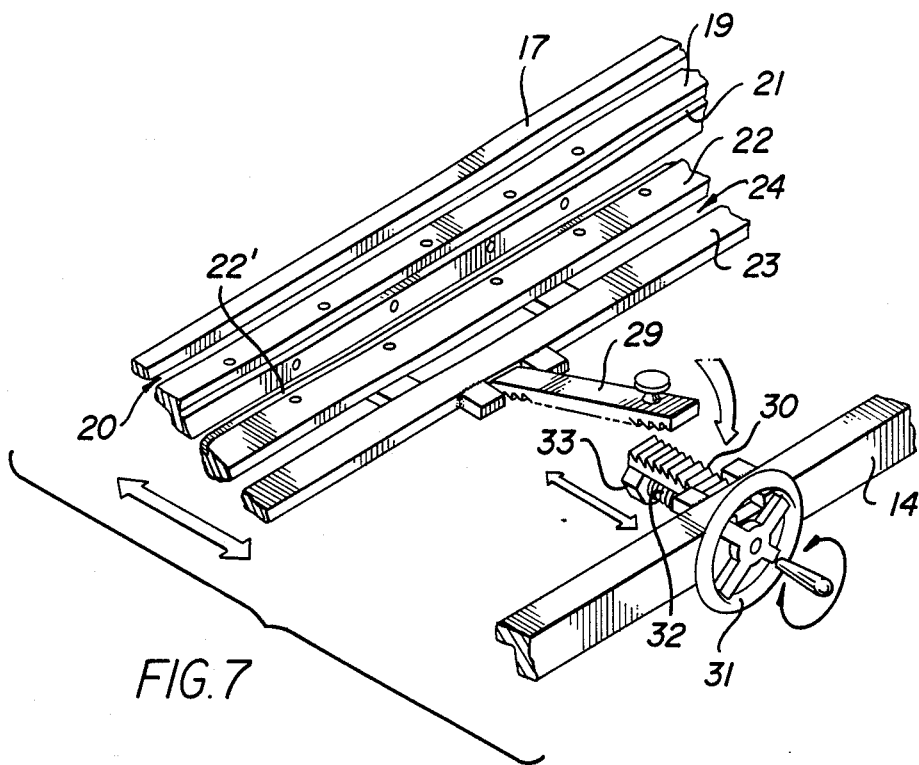
FIG. 7 is a partial perspective sideview showing the drive means for moving the movable jaw into locking position.

Referring now more specifically to FIGS. 5 and 7, it can be seen that immediately adjacent to the rear frame member 17 there is provided a fixed jaw member 60. The fixed jaw member 60 is fixed to cross members 15 and 16, and there is provided a second fixed jaw member 19 which is disposed in spaced relationship to the jaw member 60 so as to form a guideway 20 between members 60 and 19. Referring now more specifically to FIG. 7, it can be seen that the forward edge of fixed jaw member 19 is provided with a notch or groove 21 which extends along the entire length of fixed jaw member 19 for a purpose to be described more fully hereinafter.

The fixture frame 11 is also provided with a movable jaw which is adapted to be moved towards and away from the fixed jaw 19 as shown in FIG. 7. The movable jaw comprises a pair of longitudinally extending spaced bars 22 and 23 having a slot 24 therebetween to form a guideway similar to the guideway 20 formed between frame members 17 and 19. There is a groove in bar 22 as shown at 22' similar to the groove 21 in jaw 19.

The movable jaw comprising members 22 and 23 is slidably mounted on the cross members 15 and 16. Referring to FIG. 6, it can be seen that the interface of cross member 15 is formed with a trackway 25. Thre is provided a carriage 26, and on the upper surface of the carriage 26 are fixed the movable jaws 22 and 23. It can be seen that the carriage 26 is provided with rollers 27 mounted on a horizontal axis and rollers 28 mounted on a vertical axis, and these rollers are provided at each of the four corners of the carriage 26 so that the carriage can roll smoothly within the track members formed in cross members 15 and 16.

As seen in FIG. 7, there is mounted on the forward surface of the movable jaw 23 a pivoted control handle 29. By grasping the control handle 29, the operator can readily slide the moveable jaws 22 and 23 towards and away from the fixed jaw 19. It can be seen that the lower surface of the control handle 29 is ratcheted so that the control handle serves also as a ratch bar which engages with a slidable ratchet bar 30. Ratchet bar 30 is driven towards and away from the fixed jaw 19 by means of a screw drive. As shown in FIG. 7 there is provided a hand operated wheel 31 which is rotatable within the front frame member 14. Fixed to the rear of the wheel 31 is a screw drive 32 having nut 33 thereon which is fixed to the ratchet bar 30. The ratchet bar 30 is slidable within a groove in the front frame member 14, and by rotation of the hand wheel 31 the ratchet bar 30 is driven towards or away from the fixed jaw member 19.

Figure 2:
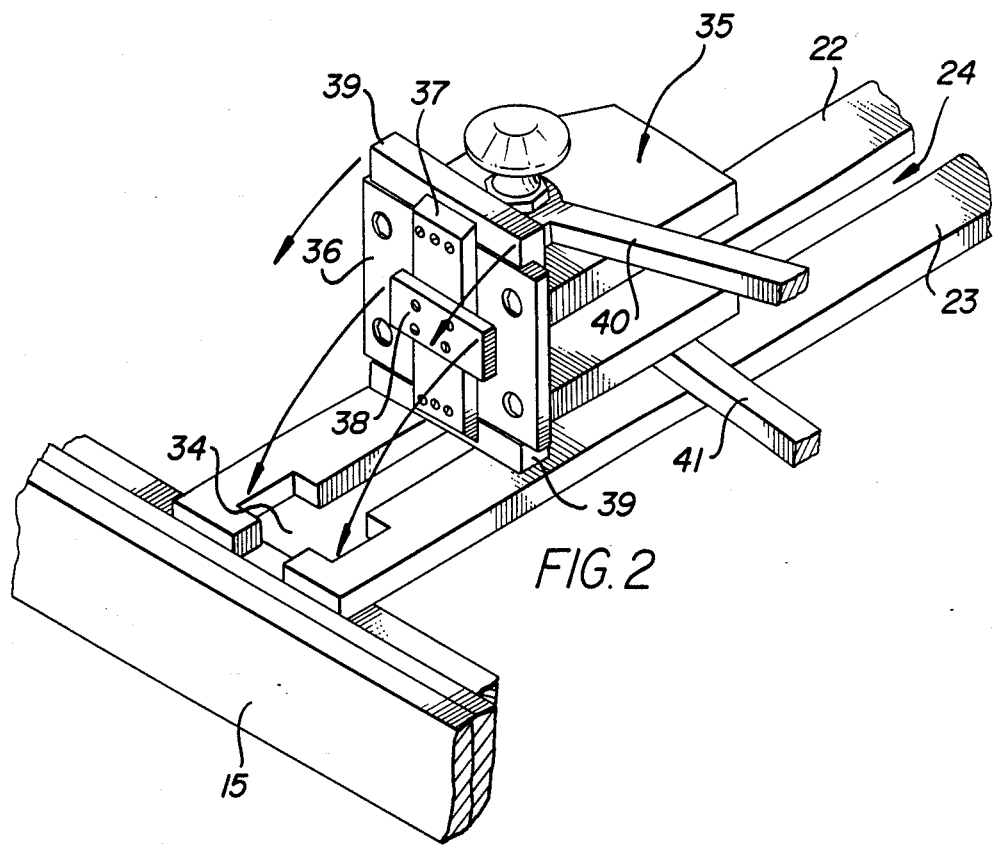
FIG. 2 is a partial perspective view of a guideway with a crimping tool rotated 90° thereon.
Figure 4:
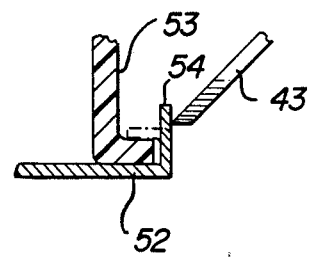
FIG. 4 is a sectional view showing the crimping tool engaging a radiator tab.
Figure 3:
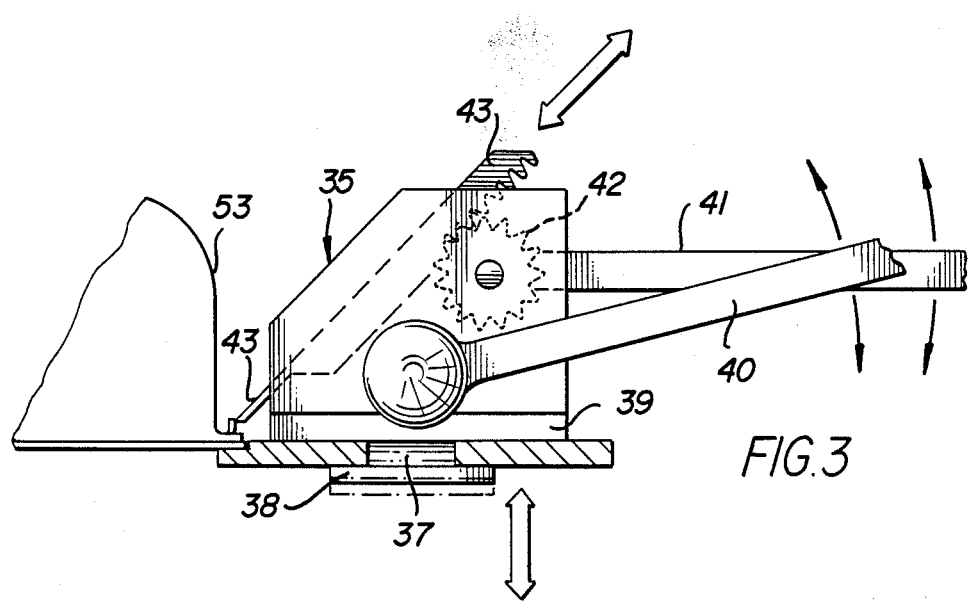
FIG. 3 is a side elevation of the crimping tool shown in FIG. 3.

Referring now more specifically to FIGS. 2 to 4 inclusive, there is shown a crimping tool and the means for mounting said crimping tool in the guideway 20 in the fixed jaw member and the guideway member 24 in the movable jaw member. With reference to FIG. 2, it can be seen that the end portion of the guideway 24 formed between movable jaw members 22 and 23 is formed with an enlarged rectangular slot 34. The crimping tool 35 is provided with a base plate 36 upon which the tool is fixedly mounted. There is provided a guide block 37 which has a pair of flanged tool guides 39 secured thereto. This guide block 37 fits within the guideway 24 and maintains the base plate 36 in proper alignment as the tool 35 is moved along the guideway 24. Fixed to the lower surface of the guideblock 37 is a locking plate 38 which is generally rectangular in shape and fits within the slot 34. Thus, it can be seen that the crimping tool 35 may be removed from the guideway 24 by sliding the crimping tool to a point where the locking plate 38 lies directly beneath slot 34. At all other positions along the guideway the crimping tool is retained within the guideway 24.

As hereinbefore noted, the crimping tool 35 and base 36 are slidably received in tool guides 39 so tht the crimping tool may be moved in a diection at 90° with respect to the longitudinal axis of the guideway 24. The crimping tool is provided with a locking arm 40 and an operating arm 41. As seen in FIG. 3, the inner end of the operating arm 41 is provided with a gear wheel 42 which engages teeth on the crimping member 43. The crimping member 43 is slidably mounted within the frame of the crimping tool 35 so that as the operating arm 41 is raised, the tool is moved downwardly and forwardly to crimp the tabs on a radiator header. The locking arm 40 is rotatably mounted on the frame of the crimping tool 35 and is provided with an eccentric (not shown) on the bottom thereof which engages the tool guide when the locking arm 40 is lowered so as to lock the crimping tool 35 with respect to the tool guide 39.

Figure 8:
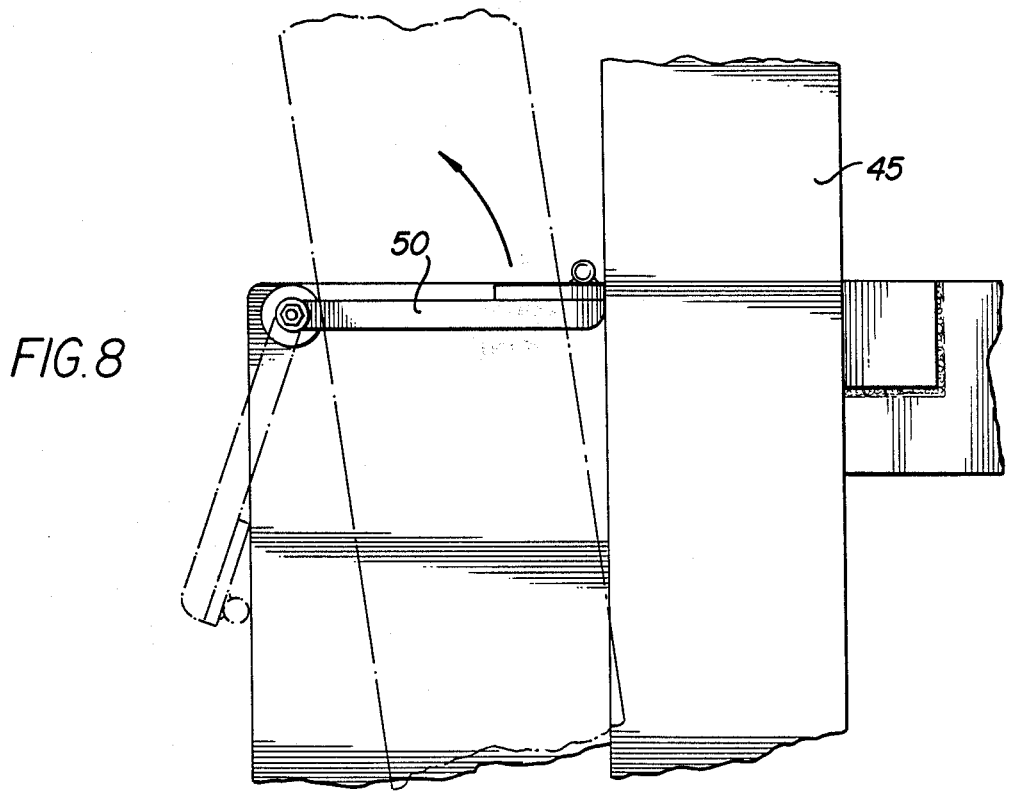
FIG. 8 is an elevational side view of the locking means for retaining the clamping means shown in FIG. 9 in operative position.
Figure 10:
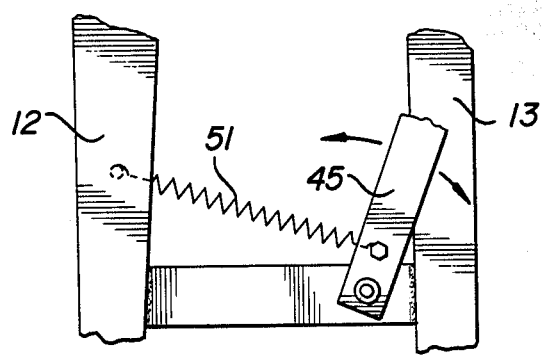
FIG. 10 is a partial elevational view of the opposite end of the fixture.

Referring now to FIG. 1, there is shown a tank clamping assembly 44. The tank clamping assembly comprises a generally U-shaped frame which is pivotally mounted upon the fixture frame 11. With reference to FIG. 1, it can be seen tht the tank clamping assembly 44 is provided with a pair of supporting arms 45 which are pivotally mounted on the fixture frame. The upper ends of the arms 45 are interconnected by spaced cross bars 46 as seen in FIG. 5. Between the cross bars 46 are supported air cylinders 47. These air cylinders have pistons 48 which are slidable between extended operative positions in engagement with the upper surface of a tank top as shown in dotted lines and an inoperative retracted positions as shown in full lines. The air cylinders and pistons are actuated by means of an operating valve 49 mounted on a supporting arm 45. Referring to FIG. 9, it can be seen that the tank clamping assembly 44 may be pivoted from the operative full line position shown in FIG. 9 to an inoperative dotted line position wherein the entire tak clamping assembly is an out of the way position so that a radiator can be readily positioned between the clamping jaws or removed therefrom. a latch member 50 as shown in FIG. 8 is pivotable between an operative position as shown in full lines where it engages the rear face of the supporting arms 45 and retains the arms in an operative position. The latch 50 may be swung to an inoperative dotted line position so that the tank clamping assembly 44 may be moved to its inoperative position. As seen in FIG. 10, there is provided a spring element 51 which extends between the front leg 12 of fixture frame 11 and the supporting arm 45 which assists in moving the tank clamping assembly from inoperative to an operative position.

In operation a radiator to be repaired is placed within the fixture frame 11. While the presently disclosed invention may be used to retain the earlier styled radiators having metal tanks soldered to the core, the fixture disclosed herein is primarily designed for use with radiators utilizing plastic tanks wherein the tank is secured to the radiator core by means of tabs which extend from the header on the end of the radiator core, and these tabs are bent down in engagement with a flange on the tank top. Referring to FIG. 4 there is shown a portion of a header 52 which is to be secured to the tank top 53 by means of a tab 54.

Initially, the tank clamping assembly 44 is in the inoperative dotted line position shown in FIG. 9 so that the upper surface of the fixture is clear of any obstruction. The movable jaws 22 and 23 are moved away from the fixed jaw 19 by manually pulling the control handle 29 so as to slide the jaw members 22 and 23 away from the fixed jaw member. The radiator to be repaired is then placed between the jaw members 21 and 22, and the control handle 29 is utilized to manually bring the jaw 22 in engagement with the opposite side of the radiator with the header resting on the groove 21 in jaw 19 and the groove 22' in the jaw 22. The control handle is then engaged with the ratchet bar 30 and the hand wheel 31 rotated to push the jaw 22 into tight engagement with the radiator so that the radiator is firmly retained between the two jaw elements. The tank clamping assembly 44 is then moved to operative position and locked in that position by pivoting latch 50 to the position shown in full lines in FIG. 8. Operating valve 49 is then opened to force the piston heads into engagement with the top of the plastic tank as shown in dotted lines in FIG. 1. The radiator is then firmly retained in position and, with a conventional decrimping tool, the tabs 54 may be disengaged with the tank so that upon release of the tank clamping assembly, the tank may be removed from the radiator.

After repair or replacement of the tank or the core, the tank is placed on the radiator header and the tank clamping assembly 44 is then again moved into operative position to retain the tank in engagement with the header. The crimping tool 35 is then placed in slot 34 and slid along the guideway 24 in the movable jaw 22 or the guideway 20 in the fixed jaw member 19 so as to position the tool so that the crimping member 43 is in alignment with the tabs 54. The crimping tool can be moved forwardly and backwardly to provide the correct alignment of the crimping tool with respect to the tab and by operation of the locking arm 40 the eccentric on the bottom end of locking arm 40 provides tight engagement between the crimping tool 35 and the top surface of toolguide 39. The operating arm 41 is then actuated to force the tab 54 into a downward crimped position so that the tank top is retained firmly in engagement with the header on the radiator core. The crimping tool 35 may be moved along the length of the guideways on each side of the tank so as to rapidly and effectively crimp all of the tabs and firmly retain the tank in engagement with the radiator core. Upon completion of crimping of the tabs, the tank clamping assembly 44 is released from its operative position and swung to the inoperative position and the hand wheel 31 is rotated to move the movable jaw out of tight engagement with the radiator so that the control handle 29 may be raised and the movable jaw 22 moved manually away from the radiator so that the radiator may be easily drawn out between the jaws.

Obviously, many modifications and variations of the present invention are possible in light of the above teachings.

What is claimed as new and is desired to be secured by Letters Patent is:

1. A device for radiator repair comprising a frame, laterally extending trackways on said frame, a fixed jaw on said frame, a movable jaw slidably mounted in said trackways, means for moving said movable jaw in said trackways toward and away from said fixed jaw, longitudinally extending guideways in said movable and fixed jaws, and crimping tool means slidable in said guideways for assembling a radiator retained in a fixed position between said jaws.

2. A device, according to claim 1, wherein said means for moving said movable jaw towards and away from said fixed jaw includes a manually operable screw drive and an arm pivoted on said movable jaw and movable from an operative position connecting said movable jaw with said screw ddrive and an inoperative position wherein said movable jaw is movable independent of said screw drive.

3. A device according to claim 1 wherein at least one end of said trackway includes an enlarged opening for removal and insertion of said tool means.

4. A device according to claim 1 and further including a crossarm pivotally mounted on said frame movable between operative and inoperative positions and extending in parallel relationship with respect to the longitudinal axis of the jaws and pressure applying means mounted on said crossarm.

5. A device according to claim 4 wherein said pressure applying means comprise a plurality of pressure cylinders having piston arms extending therefrom and heads on the outer ends of said piston arms for engagement with an end wall of a radiator retained between said jaws.

6. A device for radiator repair comprising a frame, a pair of jaws mounted in said frame, means slidably mounting one of said jaws with respect to the other jaw, drive means for moving said one jaw with respect to said jaw, detachable interconnect means extending between said drive means and said one jaw whereby, when said one jaw is detached from said drive means, said one jaw can be manually moved in relation to the other jaw and, when said one jaw is attached to said drive means, said one jaw can be moved in relation to the jaw only by said drive means.

7. A device for radiator repair according to claim 6 wherein said drive means includes a rotatable wheel mounted on the frame, a screw drive fixed on said rotatable wheel, and a nut on said screw drive having coupling means thereon for coupling said drive means with said detachable interconnect means.

8. A fixture for radiators having removable tanks comprising at least a pair of longitudinally extending members and cross bars interconnecting said longitudinally extending members to form an open generally rectangular frame, a first jaw member fixed to said cross bars in spaced relation to one of said longitudinally extending members to provide a guidway therebetween, a second jaw member slidably mounted between said cross bars, said second jaw member having a guideway therein, means for moving said second jaw towards and away from said first jaw whereby a radiator may be retained between said first and second jaws and readily removed therefrom, and crimping tool means engageable in said guideways and slidable therealong to effect replacement of tanks on radiators.

9. A fixture according to claim 8 and further including a generally U-shaped assembly pivotally mounted on said frame, header clamping means and said U-shaped assembly for engagement with the tank of a radiator clamped between said first and second jaws, said U-shaped assembly being pivotal to an inoperative position so that the radiator may be removed by being lifted upwardly from between said jaws.

10. A fixture according to claim 8 wherein said tool means includes a spaced guideway engaging bar on the lower surface thereon and each guideway includes an enlarged slot in at least one end thereof to receive the guideway engaging bar so that said tool means is slidable along the guideway and is in locked engagement therewith and may be readily removed friom the guideway through the enlarged slot.

11. A fixture according to claim 8 wherein said tool means includes a guide frame for slidably mounting said tool means in said guideways, trackways in said guide frame, a crimping tool, means mounting said crimping tool in said trackways for moving said crimping tool towards and away from a radiator retained between the jaws, means for locking the crimping tool in said trackways and operation means for driving the crimping tool downwardly and inwardly to effect crimping of tabs on the radiator.

* * * * *